UNITED STATES PATENT OFFICE.

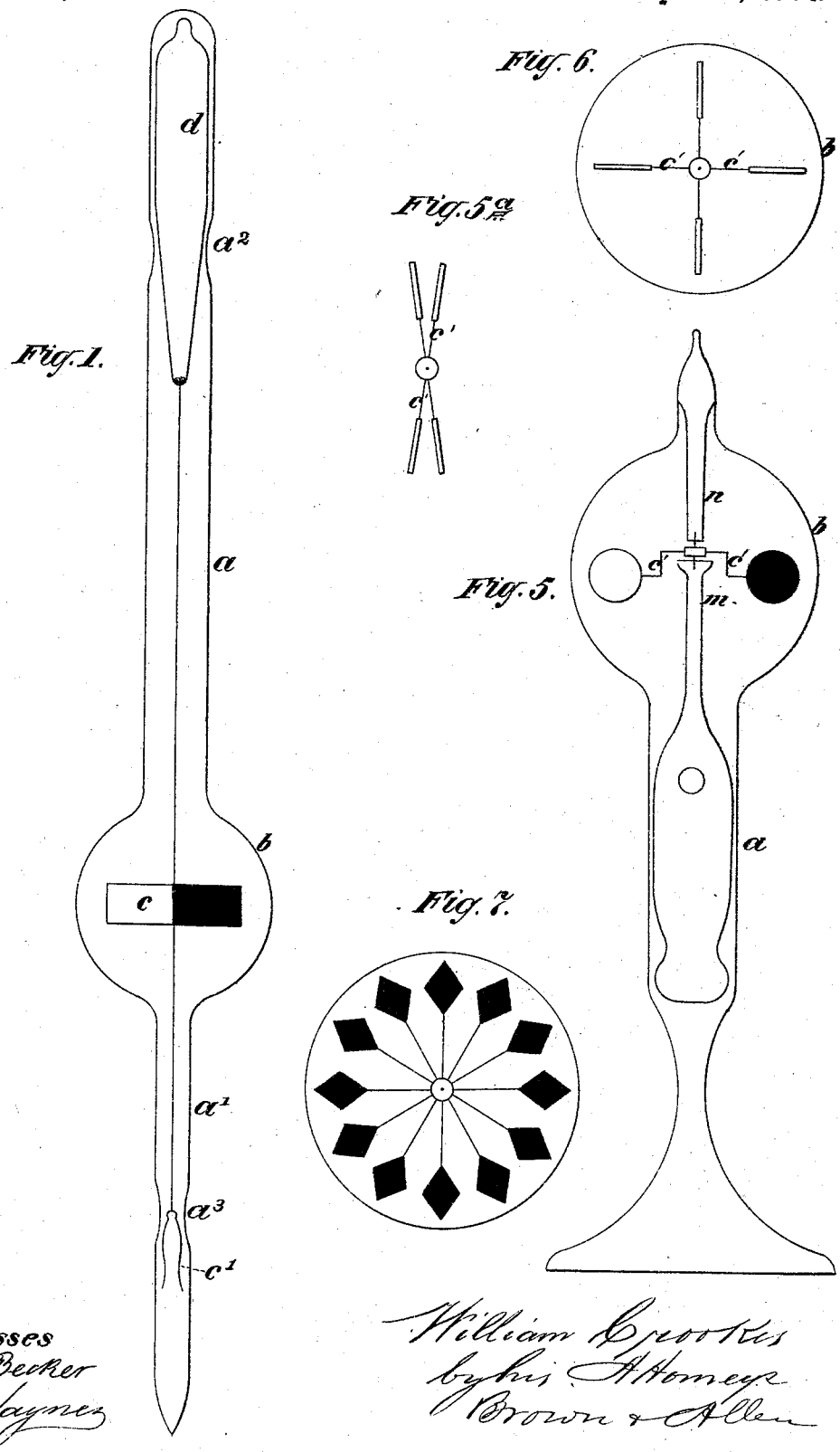

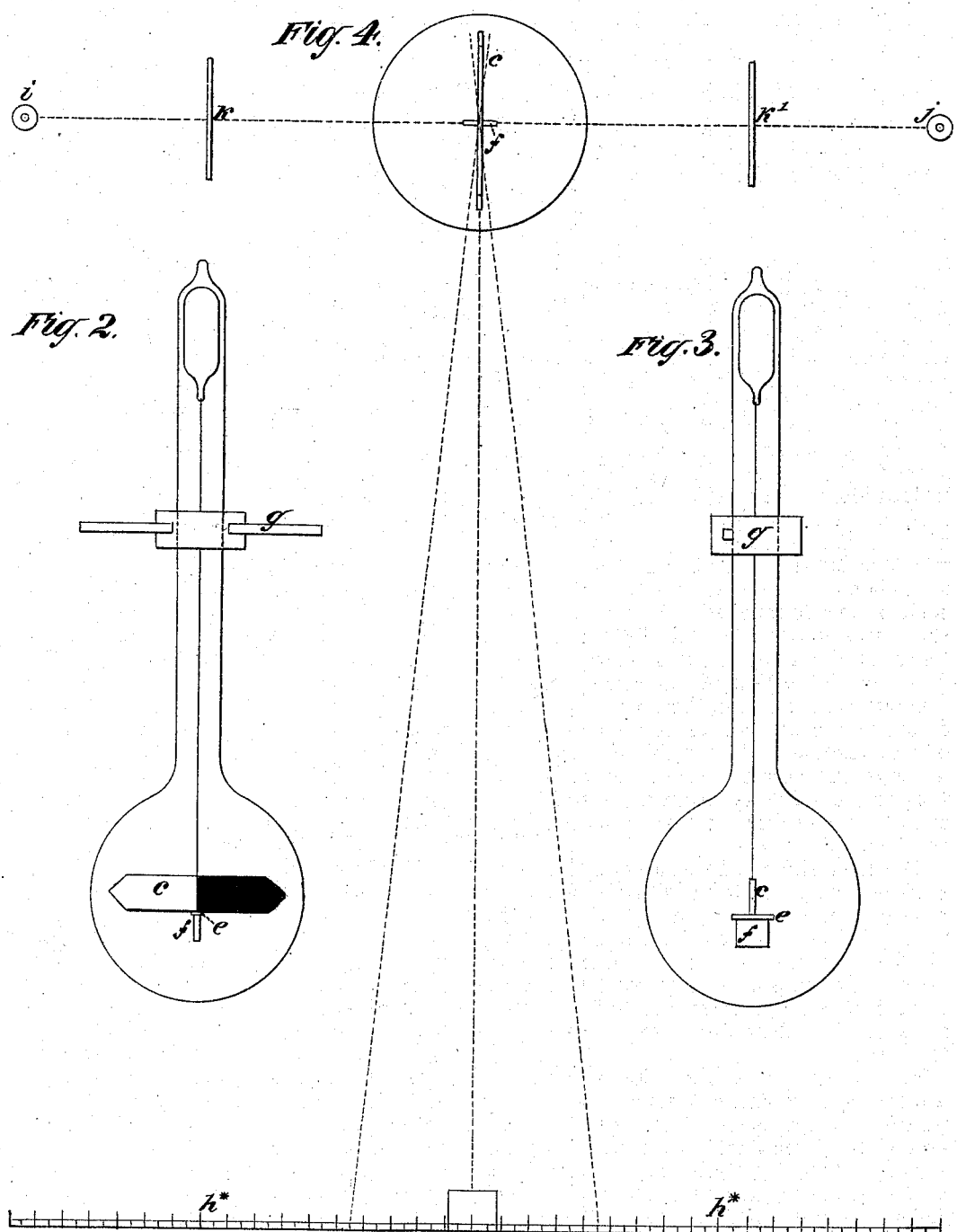

WILLIAM CROOKES, OF MORNINGTON ROAD, ENGLAND.

IMPROVEMENT IN APPARATUS FOR INDICATING THE INTENSITY OF RADIATION.

Specification forming part of Letters Patent No. 182,172, dated September 12, 1876; application filed August 10, 1876.

*To all whom it may concern:*

Be it known that I, WILLIAM CROOKES, F. R. S., of Mornington Road, in the county of Middlesex, England, have invented certain Improvements in Apparatus for Indicating the Intensity of Radiation, of which the following is a specification:

This invention relates to a method of obtaining mechanical movement by means of the rays of light, heat, or actinism (for shortness included in the term radiation.) I have discovered that when radiation from the sun, a candle, or diffused daylight, falls upon a surface which is suspended or balanced in a rarefied space in such a manner as to be free to move, such surface is repelled or moves away from the source of radiation. The lighter the body, the greater will be the extent of surface it exposes to the action of radiation; and the worse it conducts heat, the greater will be the amount of repulsion and consequent motion of the substance. Thus, a thin surface of pith is one of the best substances to use for this purpose; but I do not confine myself to this substance, as other light substances may be employed.

The color and mechanical condition of the surface have much to do with the amount of repulsion and consequent extent of motion produced by radiation—for instance, a lamp-blacked surface of pith is much more strongly acted on than a white surface, and as a rule dark surfaces are more repelled than light surfaces; but there are many exceptions to this rule.

Except in cases where special arrangements are employed to detect the movements of repulsion, the presence of air, gas, or vapor around and in contact with the thin movable surface, either greatly interferes with, or entirely neutralizes, the repulsion by radiation. Indeed, in most ordinary cases, if air be contained in the apparatus, it will (by air-currents and other less obvious actions) cause the effect of radiation to appear to be one of attraction. If, however, the instrument be inclosed in glass sufficiently strong to stand the atmospheric pressure when the air is exhausted therefrom, and the apparatus be then connected with an air-pump or other apparatus for removing the contained air, gas, or vapor, the apparent attraction will be seen to diminish as the exhaustion proceeds, until, at some intermediate stage of rarefaction, a point of partial or complete neutrality is reached at which radiation produces little or no movement in the instrument.

As the exhaustion proceeds (after this point is reached) repulsion is seen to be produced under the influence of radiation. I have found this action to become stronger as the exhaustion gets nearer perfection, the instrument being most sensitive at the highest point of rarefaction I have hitherto obtained.

By attaching a thin surface of pith, paper, clear or roasted mica, aluminium, or other light material (with the surface suitably prepared with lamp-black or otherwise) to one end of a light beam, and suspending this to the end of a bifilar suspender of silk, or to a torsion-thread of glass or other material, the amount which the surface is repelled by radiation is in proportion to the amount of radiation falling upon the surface. Therefore, by adopting any of the known means of measuring the movement, the amount of radiation falling on the surface can be estimated with more or less accuracy.

If a long surface of some light material—such as a rectangular bar of pith—be suspended in a long tube with a bulb at the end by means of a silk fiber, and the air be removed from the bulb and tube, the bar will move round if radiation be allowed to fall on one extremity of it. It will also rotate if alternate halves are coated with lamp-black, and the whole be exposed to radiation. This form of apparatus can also be used for measuring the intensity of radiation by affixing a small magnet to the pith, and placing a large magnet outside the instrument, so as to control the movement, and bring the pith bar back to zero when radiation ceases to fall on it.

I prefer to use pith in constructing such an instrument, as it does not allow heat to pass readily from one surface to another. If, instead of pith, a substance be used which permits heat to pass readily through it, either by conduction or transmission, anomalous results will be sometimes produced, and the instrument will take a long time to return to zero.

Another form of apparatus consists of four horizontal arms formed of some light material, such as straw, thin glass, fiber, or thin metal suspended on a hard steel or other point resting in a jewel or glass cup, so that the arms are able to revolve horizontally upon the center pivot. To the extremity of each arm is fastened a thin vane of pith, paper, metallic foil, talc, or other suitable substance, which should be white on one side and black on the other, so that as the arms revolve two black and two white surfaces are always exposed. The whole is inclosed in a thin glass globe or bulb, which is then to be exhausted by means of a pump or otherwise, to a very high point, and then hermetically sealed.

When radiation falls upon this instrument, the two black surfaces always exposed on one side being repelled more strongly than the two white surfaces exposed on the other side, rotation is produced, and the arms revolve with more or less velocity, the rapidity of revolution being directly proportioned to the intensity of the incident rays, all other conditions (such as material and weight of parts, color, friction of rubbing-surfaces, amount of exhaustion) being equal. If no screen be in front, counting the revolutions per minute of the rotating vanes will give an approximate measure of the total radiation.

If screens, such as water, alum, or colored glass, whereby a portion only of the incident rays are allowed to fall upon the movable vanes, are placed in front of the instrument, it may be used to measure the intensity of that portion of radiation which passes through these screens. Thus these instruments may be used to measure radiant heat, light, (white or colored,) or actinism, the movement being produced by any portion of the solar spectrum, although it is strongest under the influence of the rays at the red and ultra red end.

I do not confine myself to any particular material for forming the surfaces on which radiation is to act; nor do I confine myself to any special color or preparation of the surface, or to any method of suspending or balancing it, or to any material or form of case, whether the parts be cemented together or made in one piece; nor to any method of producing or retaining the necessary degree of exhaustion in the instrument. In the accompanying drawings, however, I have shown certain forms and constructions of instrument which have been found by experience to be most convenient and suitable to show the effects of radiation, and I will now proceed to describe these various instruments.

A very simple form of apparatus to show the effects of radiation is represented at Figure 1. It consists of a glass tube, $a$, at the lower end of which is a bulb, $b$, in which is suspended, by a fiber of silk, a bar, $c$, of pith or other light material. The silk fiber is held fast at the upper end by being connected to a plug, $d$, but the pith bar below is free to move. One half of the pith bar $c$ is blackened, while the other half is left white, the other side of the bar being treated in the same manner, care being taken that the part which is black on one side shall be white on the other, and vice versa. Before the upper end of the tube $a$ is closed the air in the tube $a$ and bulb $b$ must be exhausted by means of any convenient exhausting apparatus, so as to produce a good vacuum. The upper end of the tube $a$ may then be hermetically sealed, and the instrument is complete.

Now, if the instrument be supported in a perfectly-vertical position, so that neither the silk fiber nor the pith bar $c$, which is suspended therefrom, will touch any part of the tube or bulb, and if radiation be allowed to fall on the pith bar, the latter will be caused to move round horizontally at a speed corresponding to the amount of radiation which falls on the blackened surface.

I have found that when the pith bar is set in rotation by the action of radiation, it will not simply turn on its vertical axis, but will be inclined to deflect or move away laterally from the vertical line, and in so doing it will be liable to strike the sides of the glass bulb. This will stop (or very materially interfere with) its rotation, and in order to prevent this inconvenience I suspend a light weight, $c'$, from the lower side of the pith bar by means of a silk fiber. This weight and its suspending fiber is inclosed in the lower glass tube $a'$, and will serve to keep the pith bar steady. The rotation of the pith bar will continue until the resistance produced by the torsion of the silk fiber, from which the pith bar is suspended, equals the force of radiation. When these two forces are balanced, the pith bar will remain stationary; but if radiation be cut off by means of a screen or otherwise, the torsion of the silk fiber will have force enough to drive the pith bar back in the opposite direction until all the torsion of the silk fiber is taken out. If, however, radiation be allowed to exert its full force, the pith bar (when once the two forces of radiation and the torsion of the silk fiber are balanced) will remain stationary; but if the amount of radiation diminishes so as to disturb the balance of forces, the pith bar will commence to rotate in the opposite direction until it arrives at a point where the two forces are again balanced. If, on the contrary, the amount of radiation increases, the pith bar will again rotate in the original direction. By this means the variations in the amount of radiation will be indicated with great accuracy.

Although the instrument just described is capable of showing some of the phenomena connected with radiation, it is an imperfect instrument; but it is capable of modification and improvement, so as to render it useful as a photometer.

In the drawing, Fig. 2 is an elevation of an instrument constructed for this purpose. Fig. 3 is another elevation of the same, but seen at right angles to the former figure. Fig. 4 is a plan view of the instrument, arranged with its accessories to act as a photometer.

In this instrument the same end of the pith bar is blackened on both sides instead of the two ends being blackened on opposite sides, as in Fig. 1. Below the pith bar $c$ is suspended a small magnet, $e$, and a mirror, $f$, Figs. 2 and 3. A large controlling-magnet, $g$, is mounted outside the tube $a$, in such a manner that it can be moved up or down thereon, so as to diminish or increase its power on the small magnet $e$ below.

The apparatus thus constructed, when it is to be used for photometric purposes, is inclosed in a dark box or chamber, lined with black velvet, and provided with apertures for the rays of light to pass in and out. A lamp, $h$, placed at any convenient distance, is made to throw a beam of light through a hole in the casing or box onto the mirror $f$, which reflects it back onto the graduated scale $h^*$, as indicated by dotted lines in Fig. 4. If, therefore, the pith bar $c$ be made to turn on its center of motion ever so slightly, the reflected beam of light from the mirror will travel along the graduated scale a distance corresponding to the extent of motion of the pith bar.

In Fig. 4, $i$ and $j$ are two lights, one of which may be a standard candle, and the other a gas or other burner, the amount of light from which it is desired to measure or estimate. $k$ $k'$ are two screens, whereby the light from either $i$ or $j$ may be cut off when required.

It will be evident that if either of the screens $k$ or $k'$ be removed, the light or radiation from the exposed candle or burner will fall on the blackened end of the pith bar and will repel the same, and the beam of light reflected from the mirror will travel a corresponding distance along the graduated scale. If the screen that has been removed be now replaced, and the opposite one removed, so as to expose the other light, the pith bar will be repelled in the opposite direction, and, if the photometric power of the two lights be the same, the beam of light reflected from the mirror will indicate the same degree on the scale as it did in the former case, but on the opposite side of zero. If the photometric power of the two lights $i$ and $j$ be the same, and the two screens $k$ and $k'$ be removed simultaneously, the radiation from the two lights being equal and acting in opposite directions, the result will be that the pith bar will remain stationary.

From the above explanation it will be understood how the instrument may be used for testing the power of a gas-light. For instance, the standard candle may be placed at a convenient distance from the pith bar, so that the reflected beam of light from the mirror will indicate, say, one hundred degrees on the graduated scale. Then, the candle having been removed, the gas-light to be tested is placed at such a distance on the opposite side of the pith bar that it exactly balances the candle—that is to say, it must be placed at such a distance from the pith bar that when the gas-light alone shines on the pith, the reflected beam of light from the mirror will mark one hundred on the opposite side of the graduated scale. Then, by measuring and squaring the two distances, I get the exact proportion between the gas and the candle. For instance, supposing when I place a standard candle at twelve inches from the pith bar, it marks one hundred on the scale, and a gas-burner at thirty-two inches from the opposite side will mark one hundred; then, the square of twelve being one hundred and forty-four, and the square of thirty-two being one thousand and twenty-four, I find that the gas-burner is equal to more than seven standard candles.

Fig. 5 is an elevation, and Fig. 6 a plan view of another form of instrument, which differs from that shown at Fig. 1, inasmuch as continuous rotation is obtained so long as radiation is allowed to act on it. On the upper end of a glass tube, $a$, is made a bulb or globe, $b$, which incloses the rotating arms $c'$ $c'$. These latter are made of glass or light metal, such as aluminium or copper, and they carry at their extremities vanes of pith, mica, or metal, which are blackened on one side only. These arms, it will be seen, are arranged at right angles to each other, and through their center part is passed a fine needle-point, which rests in a small cup, $m$, at the upper end of a glass support, which is fixed by cement or otherwise in the glass tube $a$.

In order to introduce the arms through the tube $a$ into the bulb, they are turned or folded on their center-pin, as shown at Fig. 5$^a$, and when inside the bulb, they may be opened out to right angles and fixed in that position by a small piece of cement.

In order to prevent the arms $c$ from falling off the cup $m$, the fine needle-point which carries the arms is extended upward and enters the open end of a tube, $n$, which extends down from the top of the bulb. The tube $a$ and the bulb or globe $b$ are exhausted of air by means of a Sprengel pump, or in any other convenient manner, and then the end of the tube $a$ is hermetically sealed, and, when the instrument is mounted in a suitable stand, it is complete and ready for use.

In the instruments above described, rotation is produced by radiation falling on the blackened surfaces sidewise or in a horizontal direction, the rotation being due to the more energetic action of radiation on the blackened surfaces in comparison to what it has on a white surface. It has been ascertained by experiment that calling the action of radiation on lamp-blacked pith as one hundred, the action on white pith is eighteen, the difference between the two being the useful amount of residual force which is left to produce rotation.

In Fig. 7 I have shown another form of instrument, in which there is no counteracting force of the character of the white surfaces, as in the other instruments. In this instance the vanes are blackened on both sides, and they are attached to horizontal arms, but with their faces set at an angle to the horizon. The instrument will therefore be acted on most energetically when radiation falls on it in a vertical direction, either from above or from below. In constructing instruments of this class, I prefer to use numerous vanes and arms, as shown in the figure, instead of confining myself to two or three arms, with a corresponding number of vanes, as in the other instances. The rotating arms may either be provided with a fine-pointed center-pin, which is supported in a glass cup at the top of the central support, as shown at Fig. 5; or they may be attached to an inverted cup, which will rest on a fine vertical center-pin.

In the instruments above described, radiation is made to cause the arms with the blackened vanes to rotate; but it is equally possible to make the glass envelope, consisting of the bulb $b$ and glass tube $a$, to rotate while the disks and arms are kept stationary. This is effected by holding the arms steady by means of a magnet, while radiation is allowed to fall on the blackened disks. An arrangement of this kind may be made by attaching a small horizontal-bar magnet to the rotating arms. By placing another magnet in any convenient position outside the bulb, the inside magnet, and with it the arms and blackened vanes, will be held steady, and prevented from moving round under the action of radiation. If, now, the instrument be placed in a vessel of water so that it will float clear of the sides, or if it be suspended in any other convenient manner, and if radiation be allowed to fall on the blackened vanes, the bulb or globe will have rotary motion imparted to it in a direction opposite to that in which the arms would rotate had they been free to move.

A photometer may be constructed on the principle of the instrument just described—that is to say, with an internal and external magnet, but with the difference that the internal magnet is more powerful than the external one, and, moreover, the magnet should rotate with the arms and blackened vanes by the action of radiation, while the glass envelope is held steady. The internal bar-magnet, being the more powerful, will attract the smaller external magnet, which is in connection with an ordinary Morse instrument and battery, which it is not necessary to show or describe. This external magnet is very delicately balanced on its center, and as the large internal magnet comes round with the rotating arms one of the poles of the small magnet is attracted, and electric contact is made at the bottom, thereby completing an electric circuit, so that a current of electricity will pass from the battery to the Morse instrument. A ribbon of paper is drawn by clock-work through the Morse instrument, and at each contact of the small magnet—that is, at each revolution of the radiometer—a dot is made on the traveling ribbon of paper; and, as the latter moves at a uniform speed, the dots will be close together if the radiometer rotates at great speed, or they will be farther apart if it rotates more slowly. The greater or less power of radiation, and therefore the greater or less photometric value, of a burner, in comparison with a given standard, will thus be indicated by the greater or less number of dots within a given space. Therefore, if radiation from a standard candle placed at a given distance from the instrument will cause two dots to be made on every inch of the traveling ribbon of paper, and if radiation from a gas-burner placed at the same distance from the radiometer will cause twenty dots on the paper when traveling at the same speed, it will follow that the gas-burner will possess ten times more force of radiation than the candle, or, in other words, will be equal to ten standard candles.

Having now described my invention of improved apparatus for indicating the intensity of radiation, and having explained the manner of carrying the same into effect, I claim as my invention—

1. An instrument for indicating the intensity of radiation, composed of an exhausted airtight transparent case, vessel, or chamber, and a body, which is suspended or pivoted on an axis within the said case, vessel, or chamber, to be exposed to radiation, which penetrates the said case, vessel, or chamber, substantially as herein described.

2. The combination, with an exhausted transparent inclosing case, vessel, or chamber, and a bar or series of vanes, having lighter and darker surfaces, suspended or pivoted within said case, vessel, or chamber, substantially as and for the purpose herein described.

3. The combination, with an exhausted transparent case, vessel, or chamber, and a body, which is suspended or pivoted therein to be exposed to the action of radiation, of a magnet and mirror attached to said suspended body, and a magnet placed externally to said chamber, substantially as and for the purpose herein described.

Dated the 13th day of July, 1876.

WILLIAM CROOKES.

Witnesses:
  JOHN DEAN,
  WILMER M. HARRIS,
*Both of No. 17 Gracechurch St., London, E. C.*